United States Patent [19]
Reich

[11] 3,887,121
[45] June 3, 1975

[54] APPARATUS FOR TRANSFERRING FABRIC STRIP BETWEEN ENDLESS TRANSPORTER CHAINS

[76] Inventor: Rudolf Reich, 545 Neuwied, An-der Ringstr. 6, Germany

[22] Filed: Apr. 23, 1973

[21] Appl. No.: 353,664

[30] Foreign Application Priority Data
May 27, 1972 Germany.......................... 2225970

[52] U.S. Cl. .................... 226/53; 226/74; 226/81; 226/108
[51] Int. Cl............................................ B65h 17/38
[58] Field of Search ............ 226/74, 75, 76, 80, 81, 226/108, 6, 52, 53, 173

[56] References Cited
UNITED STATES PATENTS
2,402,074 6/1946 Nield ................. 226/81 X
2,601,713 7/1952 Nield .................. 226/53 X

*Primary Examiner*—Richard A. Schacher
*Attorney, Agent, or Firm*—Stephen E. Feldman

[57] ABSTRACT

Apparatus for shuttle type embroidery machines for transferring a fabric strip or web from the pins of an endless fabric transporter chain to the pins of another endless fabric transporter chain. A transfer disc with outwardly projecting needles and fabric transporter chains is provided with pin bars which run in opposite directions and tangentially to each other in such a manner that at the points of contact the needles of the transfer disc alternate with the pins of the chain and engage the fabric strip adjacent to each other. The circumferential speed of the transfer disc and the running speed of the fabric transport chains is equal.

8 Claims, 9 Drawing Figures

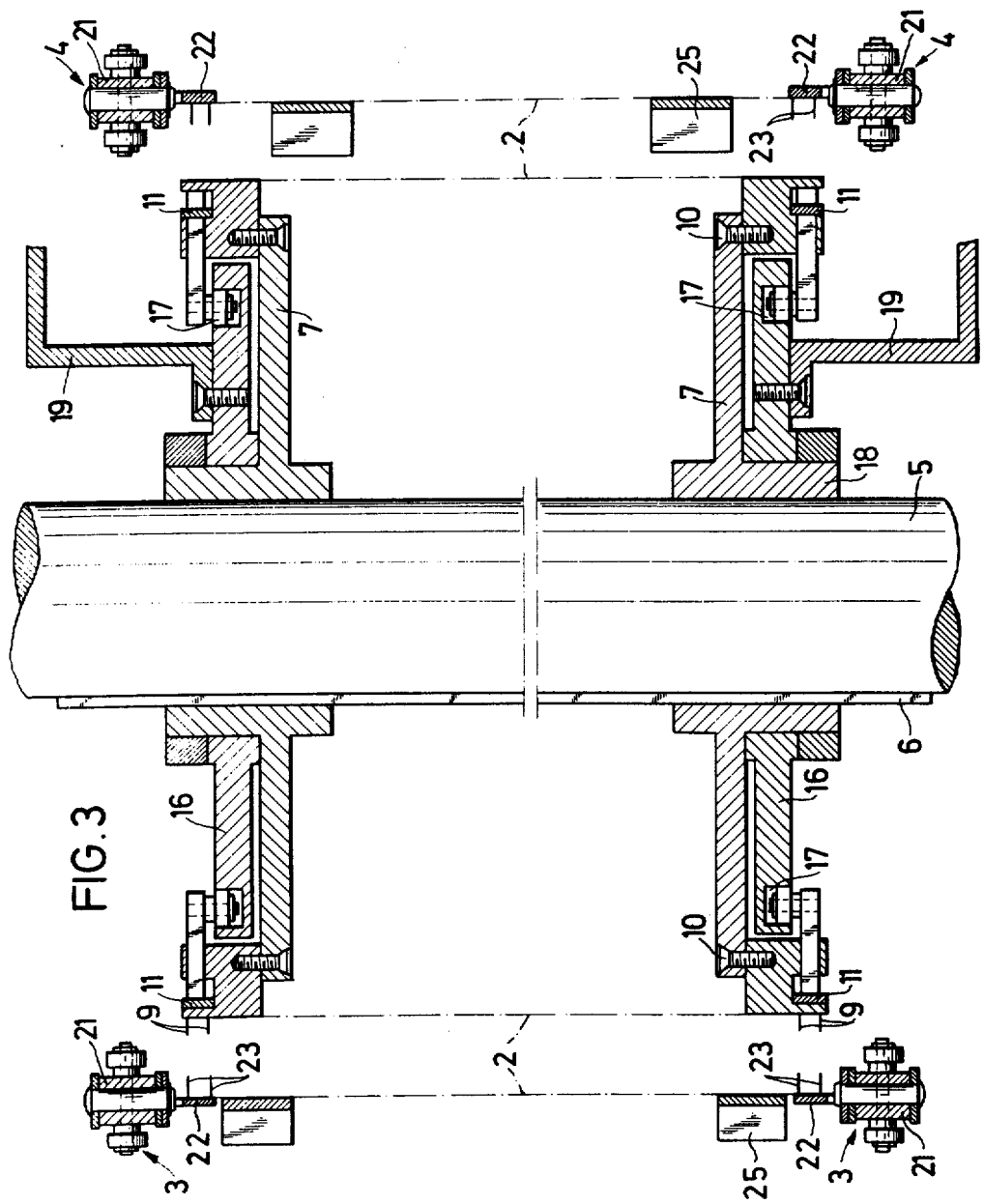

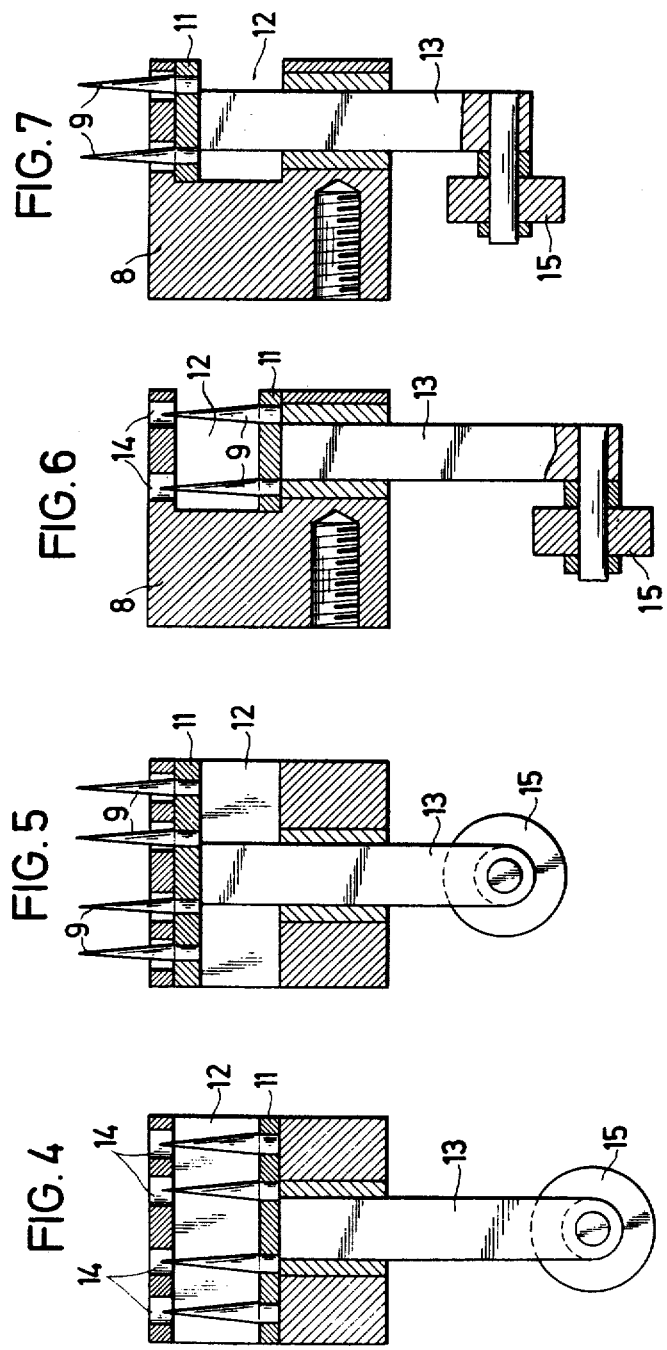

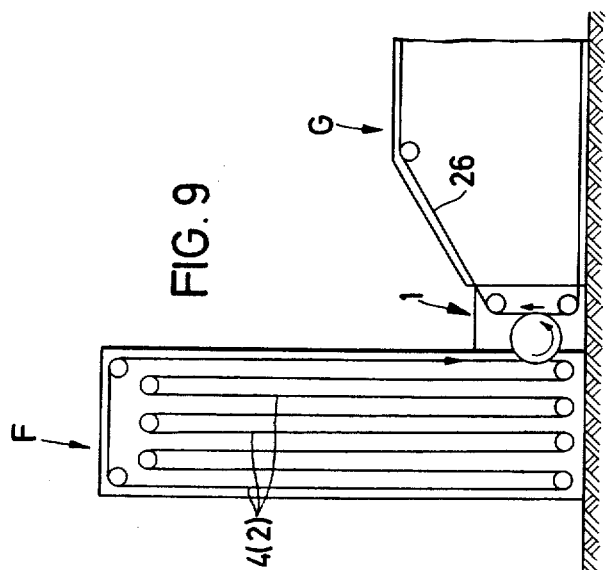
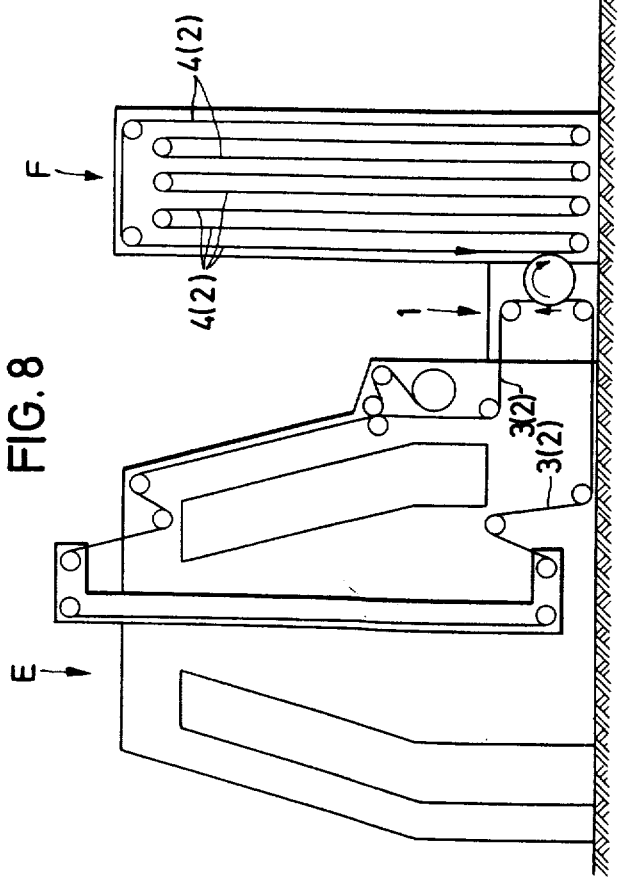

APPARATUS FOR TRANSFERRING FABRIC STRIP BETWEEN ENDLESS TRANSPORTER CHAINS

The invention refers to an arrangement for transferring a fabric strip which is pinned on an endless fabric transporter chain by pins to another endless fabric transporter chain which is also equipped with pins.

It is known that fabric strips are fed through different machining areas of special machines for making made up sections which carry decorative features such as embroidery or print patterns etc. such as blankets or parts of underwear etc. by two endless transport chains on which the edges of the fabric strips are held by straight or profiled pin bars, for carrying out different machining operations such as embroidery, printing, piercing, reinforcing, drying, cutting out etc. Previously each fabric strip part had to be removed manually from the chains of one machining appliance and it had to be pinned manually on to the chains of each further machining appliance. This required time and labour and the warp tension and the weft lay of the fabric strip part on the chains was altered. This made machining to the fabric pattern impossible in the subsequent machining appliances.

The basis of the invention is to solve the problem of producing an arrangement for diverting or transferring a continuous fabric strip, especially for shuttle type embroidery machines as basic machines, in which the diverting or transfer of the fabric strip from the endless pinned transporter chain of one machining arrangement to the endless pin transporter chain of the subsequent machining appliance is carried out without any change of the warp tension and without weft deformation so that the machining area in all successive machining appliances is matched in correct alignment with the pattern to the machining tools. The weft tension is produced by corresponding adjustment of the tensioning rails of the transporter chains. The middle region of the fabric is influenced, with reference to straight alignment, by clawing or grabbing features.

The above is achieved, according to the invention, by a transfer disc with pins which project outwards from the cylinder periphery of the transfer disc. The transfer disc contacts the two transporter chains which are equipped with profiled pin bars tangentially so that at both contact points the pins of the transfer disc engage with the fabric edge in the vicinity of the pins of the profiled pin bars of fabric transport chains which run in opposite directions. The peripheral speed of the transfer disc and of the two fabric transport chains are equal.

If both the transfer discs for both pin transport chains provided for both fabric edges are mounted at a fixed distance on a drive shaft and if the spacing of the disc can be adjusted to given fabric widths, then both transfer discs will receive the fabric strip from one pin transporter chain pair with the same longitudinal tension and weft lay and the discs will transfer the fabric strip to the subsequent pin transporter pair with the same longitudinal tension and warp lay so that the fabric which was machined in the previous machining appliance is aligned with the pattern in the correct position to the new machining appliance. In addition, owing to the above arrangement, it is no longer necessary to cut out the machined areas from the fabric strip, in order to feed them into the subsequent machining appliances; this transfer arrangement makes it possible to machine a fabric strip continuously in its longitudinal or transporting direction field by field without intervening spaces.

In the case of shuttle type embroidery machines these transfer arrangements have another special advantage. The embroidery machine can be connected to a storage arrangement in which the fabric strip, worked on the embroidery machine which works significantly more slowly on an embroidery field, can be stored for machining by more rapidly working machining appliances. The stored, embroidered fabric strip can be removed according to need for machining in further machining appliances at any time by means of this transfer arrangement. Finally, this transfer arrangement, which causes no weft distortion, makes it possible to feed the completely machined fabric strip to the start of a machining line or a cutting arrangement for cutting out of the profiled part/s from the fabric strip.

FIG. 3 is a cross section through FIG. 2 along the line III—III, in which the pinned transport chains are shown apart from the transfer disc in order to provide a better view.

FIGS. 4 and 5 show a guiding housing for the pins in a vertical longitudinal section with pin groups which are retracted and pushed outwards.

FIGS. 6 and 7 show the guiding housing according to FIGS. 4 and 5 in a vertical cross section with pin groups which are retracted and pushed outwards.

FIG. 8 shows the diagram of the side view of the method of connecting the embroidery machine to the storage arrangement by means of a transfer arrangement.

FIG. 9 shows the diagram of the side view of the method of connecting a filled storage arrangement to a production line.

An arrangement 1 is used for transferring a fabric strip 2 from both the endless pinned transporter chains 3 of a shuttle type embroidery machine to both endless pin transporter chains 4 of a storage arrangement in which the fabric strip which is continuously embroidered in the shuttle type embroidery machine is stored on two opposite rows of rolls. In this manner the slowly working embroidery machine can run day and night and the fabric strip stored during the night can be used during the day by the more rapidly working production machines or appliances. The arrows A show the transport direction of the fabric strip 2 and the arrow B shows the corresponding direction of rotation of the transfer arrangement or its transfer disc.

Figure 2:
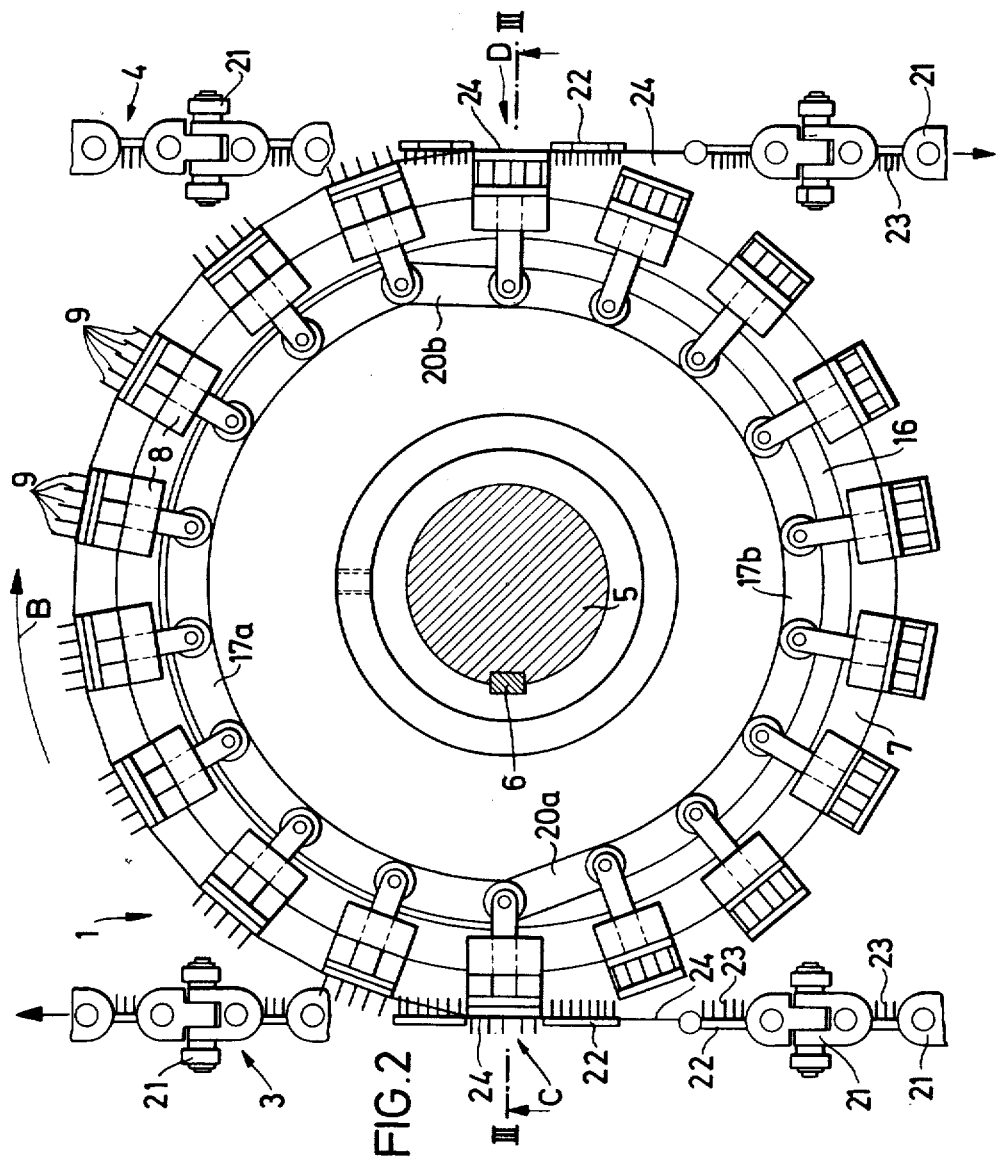
FIG. 2 shows on an enlarged scale the plan view of the transfer arrangement according to FIG. 1 with both pinned transport chains.

As seen in FIGS. 2 and 3, the transfer arrangement 1 has a transfer disc 7 which is arranged on a driving shaft 5 by means of the key 6. Guiding housings 8 for pin groups 9 are arranged radially at equal distances on the circumference of the transfer disc, by means of bolts 10 in a detachable manner. The pin groups 9 consists of a number of pins which are arranged especially in two rows which, as shown by FIGS. 4-7, are fastened on a plate 11. The pin plate 11 is arranged in a U shaped opening 12 whose one side is open towards one side of the guiding housing 8; the pin plate can slide radially. The end without pins is mounted on one end of a plunger 13 which can slide radially in the guiding housing 8. Penetrating holes 14 are provided for the pin groups 9 in the arms of the U shaped opening 12 on the side facing the pins.

Figure 1:
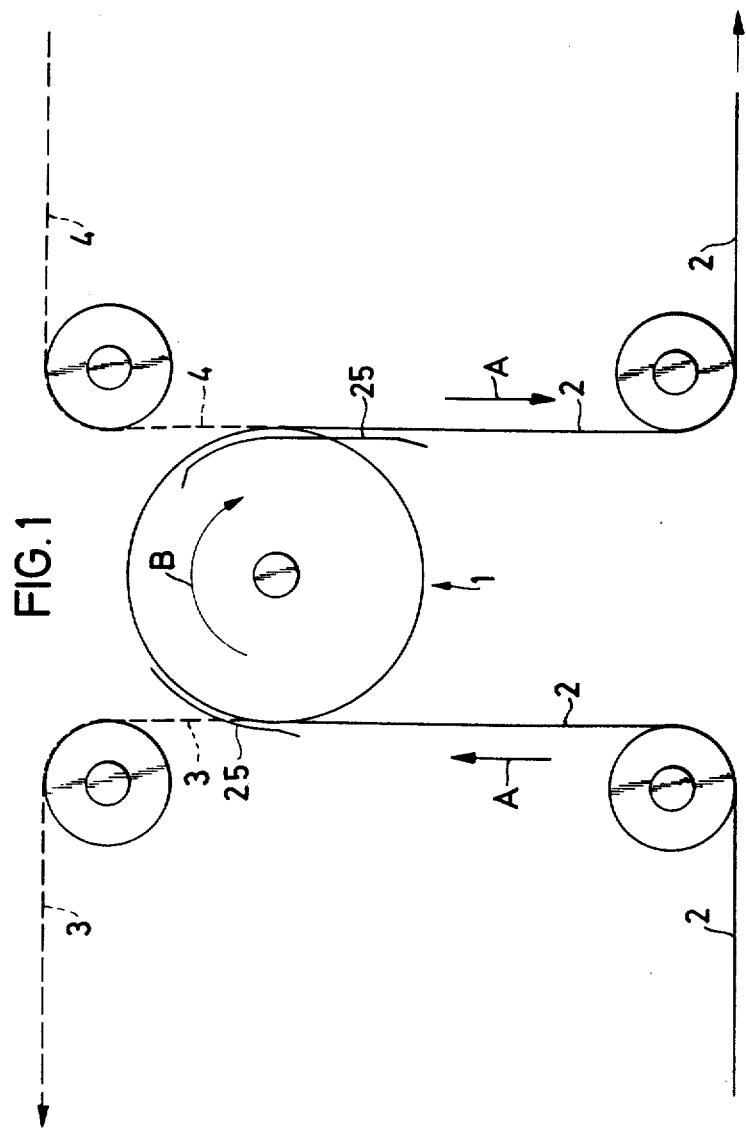
FIG. 1 shows the schematic side view of the method of operation of the transfer arrangement according to the invention. A fabric strip is mounted on endless, pinned transporter chains of two successive chain circuits on one fabric strip side.

A guiding roll 16, which runs in the cam track 17 which is cut on the cam disc 16 is arranged laterally at the other end of the plunger 13. The cam disc 16 is held on a hub 18 of the transfer disc 7 in such a manner that the hub 18 with disc 7 can rotate within it. The cam disc 16 is connected by a bracket 19 solidly with the base of the transfer arrangement 1 which is not shown, so that the rolls 15 which rotate with the transfer disc 7, the guiding housings 8 and the plungers 13 roll in the cam tracks 17 on the stationary cam disc 16. The purpose of the cam tracks 17 is to push the pin groups 9 outwards and towards the side of the transfer disc 7 on which runs the fabric strip 2 for transfer from the pin transporter chain 3 to the pin transporter chain 4, i.e. in FIG. 2 the upper half, by means of the plunger 13 and the pin plate 11, as shown in FIGS. 5 and 7. The further purpose, as in FIG. 1 lower part, is to retract them inwards into the housing 8 (FIGS. 4 and 6). In FIG. 2 the upper fabric transporting half has hence a partial circular cam track 17 a with a larger radius than the cam groove 17b in the lower, non-operational half. The radial distance between the two partially circular shaped cam track parts 17a and 17b is hence approximately equal to the stroke length of the plunger 13 for complete outward movement and retraction of the pin groups 9 at the tangential contact point C and D between the transfer disc 7 and the two pin transporter chains 3 and 4. The two partial circular shaped cam discs 17a and 17b in front of it are connected over the length of one guiding housing pitch by sloping cam track parts 20a and 20b, where the pin groups 9 are pushed out from the housing 8 and they are pushed into the edge of the fabric strip or retracted into the housing 8 in which case they are pulled out from the fabric strip edge.

The fabric transporter chains 3 and 4 consists of conventionally pivoted links 21 and of profiled pin bars 22 which are arranged between them; the fabric strip is pinned by both its edges on their pins 23. Between the pins 23 of adjacent profiled pin bars 22 an intermediate space 24 is arranged into which project the pin groups 9 of the transfer disc 7 at the contact point C for transferring the fabric strip 2 and they are retracted at the contact point D for releasing the fabric strip 2. Hence the pin group length is preferably approximately equal to the length of the intermediate space 24. However, it is equally easy to arrange the pin groups 9 to lie wholly or partly opposite the arms of the profiled pin bar 22 which support the pins 23 and their stroke is correspondingly shorter.

Fabric guiding shoes 25 are provided at contact points C and D between the disc 7 and the chains 3,4 in order to ensure that the fabric strip 2 will be released from the pins 23 or 9. The shoes 25 release the fabric strip edge from the pins 23 or 9 and push it on other pins.

In FIG. 3 the pin transporter chains 3,4 are shown at a distance from the transfer disc 7 for better viewing. Actually they are moved tangentially past the disc 7 in such a manner that the pins 9 of the disc 7 enter or leave the edge of the fabric strip closely in alignment with the pins 23 of the fabric transporter chains 3,4 at the latest when the fabric strip edge is released from the other pins, so that the correct weft lay and warp tension are maintained in the fabric strip in all instances.

The transfer arrangement operates as described below

In the given example of the model it is arranged that the continuously embroidered fabric strip is removed from an embroidery machine by means of the fabric transporter chains 3 which engage with both edges of the fabric strip 2 and it is fed by means of the fabric transport chain 4 into a storage arrangement. The two pin transporter chains which engage with both edges of the fabric strip 2 are held by the guides at such intervals that the fabric strip 2 is tightly stretched between the guides. The interval between the transport chains 3, 4 can be adjusted to suit the fabric strip width. The fabric strip 2 will be taken over at the contact point C by the pin groups 9 of the transfer disc 7 with assistance from the fabric guiding shoes 25 of the transfer arrangement 1. The discs 7 are arranged on the driving shaft 5 so that they can be adjusted; hence their distance can be matched to the distance of the transporter chains 3,4 or to the fabric strip width. The fabric strip 2 runs between the two transporter chain pairs 3 and 4 over the upper circular part of the transfer disc 7, in which successive pin groups 9 are pushed out by the cam track 17a from the guiding housings 8 and they engage with the fabric strip edge and hence maintain the transverse tension on the fabric strip.

The transfer of the fabric strip 2 is carried out in the same manner at the contact point D to the endless pin transporter chain 4 of the storage arrangement in a similar manner by making use of the fabric guiding shoe 25.

The fabric transporter chains 3,4 run parallel to each other in the design shown so that the contact points C and D are displaced at 180° relative to each other on the transfer disc 7. Of course it is possible, depending on the space requirements of the fabric transporter chains 3,4, to use inclined running paths in which case the angle between the contact points would be changed.

FIG. 8 shows the method of connection of a shuttle type embroidery machine E with a storage arrangement F by means of a transfer arrangement 1. The drawing shows the path of the endless chain pair 3 with the mounted fabric strip 2 in the embroidery machine E and the path of the endless chain pair 4 with mounted fabric strip 2 in the storage arrangement. The distance between the two endless chains 3 and 4 of each chain pair can be adjusted by the chain tensioning rails in a conventional manner to suit the fabric strip width which is being machined.

FIG. 9 shows the method of connection of a filled storage arrangement F by means of the transfer arrangement 1 to the first machining appliance G of the connected production line, in which each further machining appliance is also provided with pin chains 26 which can be adjusted to suit the width of the fabric strip.

I claim:

1. Apparatus for shuttle type embrodery machines for transferring a fabric strip from the pins of an endless fabric transporter chain to the pins of another endless fabric transporter chain comprising a. a transfer disc with outwardly projecting pins, b. fabric transporter chains which run in opposite directions to each other and have pins mounted on bars thereon c. the pins being mounted so that at a point of contact between said transporter chains and said transfer disc two different pins engage the fabric strip adjacent to each other d. the transfer disc and the fabric transporter chains running at the same circumferential speed.

2. The apparatus of claim 1 wherein the pins are movable radially from transfer disc and are in engagement with a fixed cam.

3. The apparatus of claim 1 wherein the pins correspond to the arrangement of the bars and are arranged in groups in separate guiding housings on the periphery of the transfer disc and are slidable radially.

4. The apparatus of claim 3 wherein the pins are arranged in groups on a plate which is movable radially in an opening of the guiding housing, the plate being fixed on a plunger grounded in the housing and which acts in cooperation with the cam disc.

5. The apparatus of claim 4 wherein the circumferential length of the pin groups is at most equal to the interval between two adjacent bars of the fabric transporter chains and the guiding housing is arranged at an interval in the circumferential direction on the transfer disc so that the pins groups of the disc engage with the intermediate space between the bars.

6. The apparatus of claim 1 wherein the cam disc has a cam groove track for the plunger and is mounted on a rotating hub of the transfer disc by means of a bracket fixed to a stationary stand and wherein the plunger engages the cam groove by means of a follower roller.

7. The apparatus of claim 1 wherein the fabric guiding shoes are arranged at transfer stations.

8. The apparatus of claim 1 wherein the transfer disc is arranged on a diving shaft so that it can be moved and adjusted.

* * * * *